US012572192B2

(12) United States Patent (10) Patent No.: US 12,572,192 B2

Athavale (45) Date of Patent: Mar. 10, 2026

(54) POPULATION-BASED ENERGY CONSUMPTION DISCOVERY FOR RECONFIGURATION RECOMMENDATIONS

(71) Applicant: Microsoft Technology Licensing, LLC, Redmond, WA (US)

(72) Inventor: Rasika Bhalchandra Athavale, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 18/401,046

(22) Filed: Dec. 29, 2023

(65) Prior Publication Data

US 2025/0216921 A1     Jul. 3, 2025

(51) Int. Cl.
*G06F 1/3206* (2019.01)
(52) U.S. Cl.
CPC .................................. *G06F 1/3206* (2013.01)
(58) Field of Classification Search
CPC .................. G06F 1/3206; G06F 1/3203; G06F 9/44505
See application file for complete search history.

(56) References Cited

U.S. PATENT DOCUMENTS

| | | | |
|---|---|---|---|
| 2013/0332749 A1* | 12/2013 | Kida ..................... | G06F 1/3206 713/300 |
| 2014/0277603 A1* | 9/2014 | Ditlow ................... | G05B 15/02 700/32 |
| 2024/0037002 A1* | 2/2024 | Aurongzeb ............. | G06F 9/542 |

OTHER PUBLICATIONS

"Technical Guidance for Calculating Scope 3 Emissions (Version 1.0)", Retrieved From: https://ghgprotocol.org/sites/default/files/standards/Scope3_Calculation_Guidance_0.pdf, Retrieved on: Jun. 3, 2025, 182 Pages.
Chamberlin, Scott, "Measuring Your Application Power and Carbon Impact (Part 1)", Retrieved From: https://devblogs.microsoft.com/sustainable-software/measuring-your-application-power-and-carbon-impact-part-1/#:~:text=Conversion%20to%20CO2, 10%5E%2D4%20mtCO2e, Sep. 14, 2020, 8 Pages.

* cited by examiner

*Primary Examiner* — Jaweed A Abbaszadeh
*Assistant Examiner* — Gayathri Sampath
(74) *Attorney, Agent, or Firm* — Holzer Patel Drennan

(57) ABSTRACT

A disclosed method facilitates identification and recommendation of alternative device configuration(s) with the potential to reduce or mitigate the energy footprint of a particular application on a user device. A disclosed method includes determining a user device energy footprint for an application executing on a user device and determining a per-device energy footprint for the application with respect to a population of user devices executing the application that are characterized by a device configuration not shared by the user device. An energy savings metric is determined based on a comparison between the per-device energy footprint within the population and the user device energy footprint. In response to determining that the energy savings metric is indicative of a potential energy savings, an energy savings reconfiguration recommendation is generated.

20 Claims, 4 Drawing Sheets

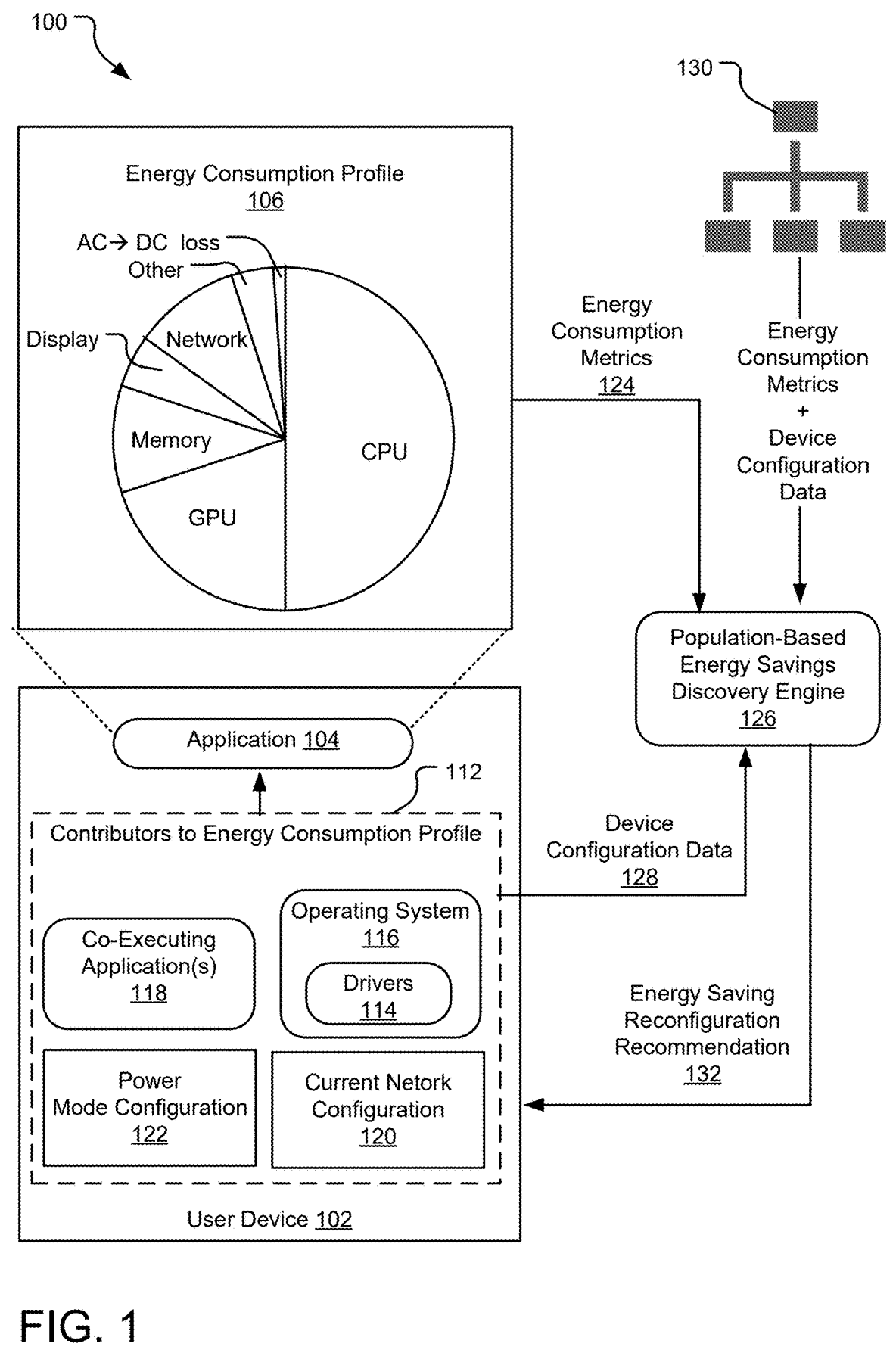

100

130

Energy Consumption Profile
106

AC → DC loss
Other
Display
Network
Memory
CPU
GPU

Energy
Consumption
Metrics
124

Energy
Consumption
Metrics
+
Device
Configuration
Data

Population-Based
Energy Savings
Discovery Engine
126

Application 104

112

Contributors to Energy Consumption Profile

Device
Configuration Data
128

Co-Executing
Application(s)
118

Operating System
116

Drivers
114

Energy Saving
Reconfiguration
Recommendation
132

Power
Mode Configuration
122

Current Netork
Configuration
120

User Device 102

FIG. 1

POPULATION-BASED ENERGY CONSUMPTION DISCOVERY FOR RECONFIGURATION RECOMMENDATIONS

BACKGROUND

Energy-efficiency ratings are increasingly common and are often advertised to consumers, such as for energy-efficient appliances. In most cases, power efficiency is assessed at the device level and determined based on measured power consumption of the device when performing routine tasks. When it comes to a computer, however, the software driving task execution can also significantly influence overall power consumption of the computer. Different versions of a same software application can, for various reasons, be characterized by varying amounts of total energy consumption, such as due to energy savings that arises in relation to how the logical operations of the application are carried out. However, it is not straightforward to compare or assess the energy efficiency of different applications, or even different versions of the same application, because the total energy consumption of an application is tightly intertwined with the physical hardware configuration and the software configuration on a given user device. Stated differently, different quantities of energy may be expended when executing the same version of an application on two different devices due to differences in the underlying hardware and software configurations of those devices.

The complex energy-consumption dependencies that exist between each application on a device and the underlying software and hardware configuration of the device make it difficult to assess and identify device configuration alterations that can lead to energy savings while executing a given application.

SUMMARY

According to one implementation, a disclosed method provides for determining a user device energy footprint for an application executing on a user device based on energy consumption data collected by the user device. The method further provides for collecting the energy consumption data from devices within a population of user devices executing the application that share a device configuration not shared by the user device. Based on the energy consumption data from the devices within the population, a per-device energy footprint for the application is determined with respect to the population and an energy savings reconfiguration recommendation is generated for the device in response to identifying a potential energy savings based on a difference between the per-device energy footprint within the population and the user device energy footprint. The energy savings reconfiguration recommendation identifies an alternative configuration for the user device that matches the device configuration shared by the user devices within the population.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 1 illustrates an example system that employs a population-based approach to identifying and recommend-ing alternative device configurations that reduce or mitigate the energy footprint of a particular application on a user device.

DETAILED DESCRIPTION

Figure 2:
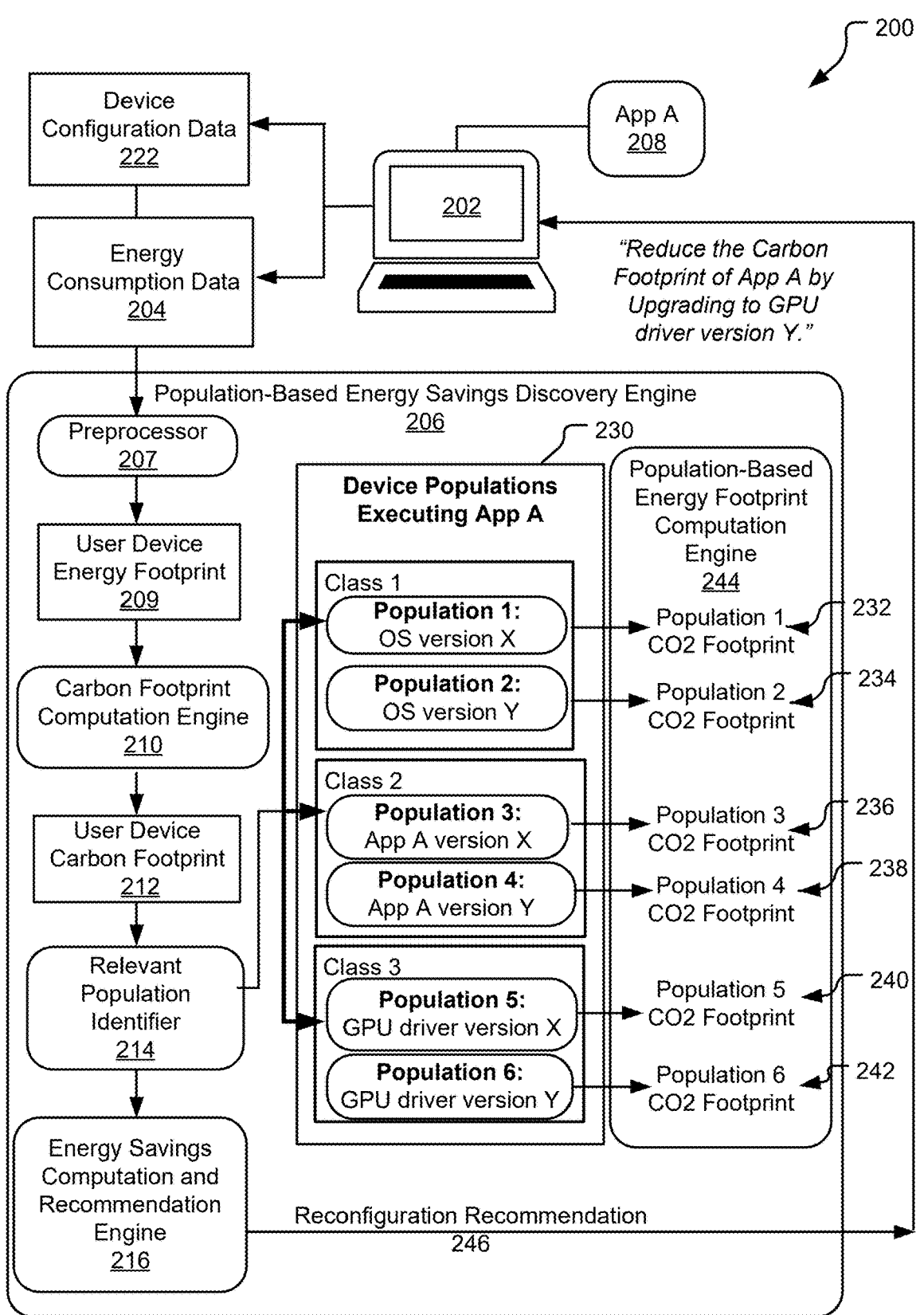
FIG. 2 illustrates aspects of another example system that employs a population-based approach to identify and recommend energy-saving configurations for a user device.

The herein disclosed technology includes an application-based energy savings recommendation tool that identifies and recommends alterations to the configuration of a user device can be implemented to realize an energy savings on that user device while the user device is executing a particular application. The energy savings recommendations are identified, in part, by collecting population-specific metrics pertaining to an energy consumption profile of the application. An application's energy consumption profile can be measured in terms of various hardware components and hardware-based subsystems that perform energy-consuming operations on behalf of the application. The energy consumption profile of an application may, for example, be broken down into a distribution that includes power consumed by processor(s) while carrying out the logical operations of the application, power consumed by network components that transmit and receive data on behalf of the application, power consumed by memory—e.g., to drive read and write components in disk-based storage and/or to program cell voltages in solid state storage (SSD), power consumed in decoding and rendering graphics of the application, power consumed by the display, and more.

According to one implementation, the herein-disclosed technology provides for collecting and aggregating energy consumption metrics associated with the energy consumption profile of an application for different populations of devices. Each of the populations consists of devices that share a particular configuration identified as being a potential contributor to the energy consumption profile of the application. From these aggregated metrics, populations characterized by lower energy consumption during the application's execution can be meaningfully extracted from the vast pool of countless variable device configurations in everyday use, and the energy consumption metrics of these populations can be used as a basis for quantifying potential energy savings realized by altering the device configuration. Device-specific configuration changes can then be recommended, as appropriate, to help reduce total energy expended in association with execution of specific applications.

FIG. 1 illustrates an example system 100 that employs a population-based approach to identifying and recommending alternative device configurations that reduce or mitigate the energy footprint of a particular application on a user device 102. As used herein, the "energy footprint of an application" refers to a quantity of energy expended as a direct or indirect result of operation(s) executed by the application or other software components in support of the functionality of the application over a given (e.g., pre-defined) in association with one or multiple predefined time interval(s).

The user device 102 is configured to collect or otherwise determine energy consumption data including metrics that describe the energy footprint of the application 104. In FIG. 1, the energy footprint for an application 104 is illustrated by a graphic referred to below as an energy consumption profile 106. The energy consumption profile 106 illustrates a break-down of energy expenditures itemized across various energy consumption sources (e.g., hardware components). The energy consumption profile 106 is intended to include energy consumption that contributes to the energy footprint of the application 104 and to exclude other energy expen-ditures of the user device 102 that occur in support of other device operations or processes without dependency on the operations of the application 104. For example, the "CPU" energy shown in the energy consumption profile 106 corre-sponds to energy that the CPU consumes in support of the application 104 during a given time interval rather than the total energy that the CPU consumes during the time interval. If, for example, CPU utilization reaches 80% max for an interval, it may be that 10% of this is attributable to processing operations of or in support of the application 104 and the other 70% is due to other co-executing applications. The energy expenditure corresponding to this 10% is the "CPU" value included in the illustrated energy consumption profile 106.

For example, the energy consumption profile 106 includes energy expenditures that occur on behalf of the application 104 by hardware components that include: a central pro-cessing unit (CPU) of the user device 102, a graphics processing unit (GPU) of the user device 102, memory (e.g., both volatile and non-volatile, as applicable), a display (e.g., to display graphics of the application 104), and network components (e.g., to receive and send data of the application 104 across a network). Additionally, the energy consumption profile 106 quantifies energy "loss" that occurs when the device is supported by DC power (e.g., a battery) rather than plugged to an AC source, and "other" (e.g., representing energy expenditures by other hardware components that are, when examined individually, less than a predefined quantity defined by a software program that generates the illustrated graphic). In general, each different application is character-ized by a different version of the energy consumption profile 106 that may reference different energy consumption sources than those shown as well as variable quantities of energy consumed by those sources.

The application 104 can, in various, implementations, be any application executing on the user device 102 including those that execute at the application layer (e.g., by a device operating system 110) as well as software components that are part of the operating system itself. For example, the application 104 is any of communication application (e.g., email, web-conferencing), a gaming application, a web-based plugin for media streaming or gaming, a coding development application, an application for word processing or illustration, etc.

For ease of conceptual illustration, the energy consump-tion profile 106 is shown to be a pie graph which is, traditionally, understood in terms of fractions of a whole; however, in a real-world example, the energy consumption profile 106 identifies specific quantities of energy consump-tion (e.g., in terms of millijoules (mj) or other unit) in association with each different one of the energy consump-tion sources.

Notably, identical versions of the application 104 may be characterized by different energy consumption profiles on different devices due to energy-dependencies between operations of the application and the configuration of locally-installed software and user-configurable settings on those respective devices that support the application 104. The locally-installed software and user-configurable settings on the user device 102 are collectively referred to herein as "configurable contributors 112"—e.g., device features that are configurable (e.g., changeable by altering device settings or by installing/removing software) and that contribute to the energy footprint of the application 104 in some way, such as due to carrying out tasks at the instruction of the appli-cation 104 or otherwise.

In FIG. 1, the configurable contributors 112 include an operating system 116 and various drivers 114 installed on the operating system 116. Notably, the application 104 may rely on functionality delivered by various operating system drivers. For example, a word processing application relies on drivers to translate keypad and mouse inputs input into data decipherable by the word processing application, and these translation operations therefore contribute to the energy footprint of the word processing application. A driver is configurable in that different versions of a same driver may exist and may be more or less power intensive. Like-wise, the operating system 116 also performs operations to execute or otherwise support functionality of the application 104 and is therefore a contributor to the energy footprint of the application 104. The operating system is configurable in the sense that different versions of the operating system can be installed on a given device and those different versions may be more or less power intensive.

The configurable contributors 112 are also shown to include co-executing application(s) 118, which is intended to encompass any applications on the user device 102 that co-execute with the application 104 and that also perform functions in support of the application 104 that impact the energy footprint of the application 104. If, for instance, the application 104 is a plug-in to a web browser, the web browser running the application 104 is a co-executing appli-cation that has an effect on the energy footprint of the application 104. Potentially, different web browsers and/or versions of those browser could consume varying amounts of energy while delivering the same functionality of the application 104 to the end user.

Although not shown in FIG. 1, it is to be understood that the specific version of the application 104 is also one of the configurable contributors 112 that contributes to the energy consumption profile 106 of the application 104. Two differ-ent versions of the application 104 may call upon different versions of libraries, drivers, etc., and/or deliver the same functionality through different sequences of operations, all of which may result in differences in total energy consump-tion.

In still further addition to the configurable contributors 112 described above, the configurable contributors 112 may also include operational modes or user-configurable settings on the user device 102 that control the state and/or operation of hardware components, such as settings pertaining to the current network configuration 120 (e.g., whether the user device 102 is connected to a network via Ethernet, Wi-Fi, or a satellite network), modes pertaining to display operation (not shown in FIG. 1) such as modes that offer different resolutions and/or brightness settings, or the power mode configuration 122 for the user device 102. For example, the current power mode configuration 122 identifies the current power source (e.g., external alternating current (AC) when plugged in or direct current (DC) when the device is depending upon battery power, and also identifies software-imposed settings for managing device power, such as settings that specify whether the battery is in a "battery saver" mode or in a "normal use" mode. Notably, loss occurs when energy is converted from AC to DC and there is therefore a higher energy expenditure associated with supporting a device in battery mode than supporting a device that is plugged in. Understandably, other configurable settings not shown in FIG. 1 may likewise impact the energy consumption profile 106 of the application 104.

According to one application of the disclosed technology, the user device 102 is configured to collect and self-report energy consumption metrics 124 for the application 104 to a population-based energy savings discovery engine 126. For example, energy consumption metrics are sampled (or computed, as appropriate) at specified times, such as at set intervals during execution of the application 104 or in response to launch and/or termination of the application 104. The energy consumption metrics 124 include some or all information used to construct a complete energy footprint for the application 104 for one or more multiple time interval of interest.

In various implementations, the energy consumption metrics 124 are collected differently. In one implementation, these metrics are collected automatically by the operating system 116 of the user device 102. In other implementations, the energy consumption metrics are collected by a baseboard management controller (BMC) (e.g., in a server at a data center) or by a software application that is downloaded to and locally executed on the user device 102.

In addition to transmitting the energy consumption metrics 124 to the population-based energy savings discovery engine 126, the user device 102 also transmits device configuration data 128 that identifies the configurable contributors 112 for the application 104 on the user device 102. In one implementation, the device configuration data 128 includes a summary that identifies various software components installed on the user device 102 (e.g., operating system components and applications) as well as current settings pertaining to configuration(s) of the user device 102. The device configuration data 128 may be retransmitted to the population-based energy savings discovery engine 126 periodically or in response to detected changes pertaining to locally-installed software and user-configurable settings.

In some implementations, the user device 102 collects and sends the energy consumption metrics 124 to the population-based energy savings discovery engine 126 for each of multiple applications executing on the user device 102. The population-based energy savings discovery engine 126 determines an energy footprint for each such application with respect to the user device 102 as well as for other networked devices 130 with different software and/or setting configuration. For example, the other networked devices 130 may include thousands of millions of other devices executing the application configured to report the same types of information as that described above.

The population-based energy savings discovery engine 126 uses a population-based data aggregation approach to quantify typical (e.g., average) energy consumption that occurs on behalf of the application 104, or for certain types of events driven by the application 104, with respect to populations of devices that share certain respective configurations of the configurable contributors 112. For example, the population-based energy savings discovery engine 126 defines populations of user devices (from among the networked devices 130) executing the application 104 that correspond to different "operating system configurations," and two populations are defined for this class including a first population that includes devices executing a first version of an operating system and a second population in that includes devices executing a second version of the operating system, with the energy consumption metrics 124 being collected from devices in both populations and stored in association with each respective population.

The population-based energy savings discovery engine 126 collects and aggregates the energy consumption metrics 124 for the defined populations of the networked devices 130 executing the application 104, and these metrics facilitate computation of a per-device energy footprint for the application 104 with respect to each defined one of the populations. In some implementations, the per-device energy footprint is a carbon footprint determined based on energy consumption metrics together with renewable energy data obtained from a geographical jurisdiction of the user device 102. The per-device energy footprint of various populations is compared to an energy footprint determined for the user device 102 (e.g., from the energy consumption metrics 124) to identify populations (and their respective device configurations) characterized by a smaller energy footprint of the application 104 as compared to the user device 102.

In response to identifying a select one of the populations that is characterized by a smaller energy footprint of the application 104, the population-based energy savings discovery engine 126 generates an energy savings reconfiguration recommendation 132 that recommends the user device be re-configured to match the configuration associated with the select one of the populations. If, for example, user device is running Windows 10® and the population-based energy savings discovery engine 126 determines that the application 104 has a smaller energy footprint when executed on a population of devices running Windows 11, the energy savings reconfiguration recommendation 132 suggests that the user upgrade the operating system of the user device 102 from Windows 10 to Windows 11 to reduce energy consumption associated with the application 104. The energy savings reconfiguration recommendation 132 is transmitted to the user device 102 and presented on a display of the user device 102 (e.g., by operating system 116 or other application).

FIG. 2 illustrates another example system 200 that employs a population-based approach to identify and recommend alternative configurations for a user device 202 that reduce or mitigate the energy footprint of a particular application executing on the user device 202. The system 200 includes a population-based energy savings discovery engine 206 that receives both energy consumption data 204 and device configuration data 222 from various user devices, including the user device 202.

The energy consumption data 204 can be understood as including data that is usable to define or derive a complete energy footprint for an application 208 (App A) that executes on the user device 202. In one implementation, the energy consumption data 204 includes energy consumption metrics of the application 208 the same or similar to those described with respect to FIG. 1. In some implementations, the energy consumption data 204 also includes data that the population-based energy savings discovery engine 206 assesses for relevance and/or uses to derive certain energy consumption metrics that contribute to the energy footprint of the application 208.

In one implementation, the population-based energy savings discovery engine 206 is a cloud-based service implemented by one or more servers. The energy consumption data 204 are sent to the population-based energy savings discovery engine 206 by a software component executing on the user device that is, in one implementation, configured to collect the energy consumption data 204 for multiple different applications executing on the user device 202. The software component is, for example, a subcomponent of an operating system or an application downloaded by the user and executed by the operating system. FIG. 2 illustrates the energy consumption data 204 as being received from a single user device, but it is to be understood that the same types of metrics are likewise received from a plurality of other networked devices and that these metrics are processed in a manner consistent with the below-described processing of the energy consumption data 204.

In one implementation, the energy consumption data 204 identify quantities of energy consumption itemized by consumption source (e.g., hardware components) such as energy consumed by a CPU, GPU, memory, display, and network components, as well as energy consumption in the form of loss (e.g., energy loss due to converting AC to DC power while a device battery is acting as the primary power source). In some implementations, the itemized quantities of energy have been derived or sampled in a manner that verifies their relevance (e.g., energy dependence) to operations of the application 208 or specific application-driven event(s) of interest. In other implementations, however, a preprocessor 207 of the population-based energy savings discovery engine 206 performs operations to verify relevance of some or all of the itemized quantity of energies with respect to the application 208 or an application-driven event of interest (e.g., to confirm whether or not each itemized quantity of energy was expended on behalf of the application 208 in some way). This verification may, for example, entail correlating timestamp information associated with certain quantities of energy itemized in the energy consumption data 204 with timestamp information for an event of interest that was initiated by the application 208, such as to verify that the energy was in fact expended in support of the event.

If, for example, the application 208 is a media streaming application, the energy consumption data 204 may include timestamps indicating start and stop times for a streaming event. The preprocessor 207 correlates these start and stop times with timestamps associated with energy quantities itemized in association with a decoder or other GPU subcomponent to confirm that those quantities were indeed related to the streaming event.

Based on the above-described preprocessing (as applicable), the preprocessor 207 uses the energy consumption data 204 and/or metrics that result from the preprocessing to derive an energy footprint for the application 208 that corresponds to one or multiple time interval(s) of interest. This energy footprint is represented in FIG. 2 by "user device energy footprint 209." By example, the user device energy footprint 209 may be determined with respect to a multi-day interval—e.g., an energy footprint for the application 208 for all time that the application was running over the past day, three days, week, etc. Alternatively, the user device energy footprint 209 may be determined with respect to a shorter time period (e.g., an hour) that the application 208 was executing, a single complete instance of the application 208 from launch to termination, or even a single event (e.g., a media-streaming event) driven by the application 208. The time interval(s) of interest are, in one implementation, pre-defined by the population-based energy savings discovery engine 206 and may vary based on the identity and/or functionality of the application 208.

By example, the user device energy footprint 209 for the application 208 may include itemized quantity of energy consumption determined to contribute to the energy footprint of the application 208, as shown below:
Example Contents of User Device Energy Footprint
    CPU Energy: 39,561,772 mJ
    GPU Energy: 517,058 mJ
    Memory Energy (Disk Energy): 264,193 mJ
    Display Energy: 16,102,269 mJ
    Network Energy: 1,171,632 mJ
    Loss Energy: 902,443 mJ
    In other implementations, the user device energy footprint 209 is not itemized by consumption source and is instead a single value representing a cumulative total energy consumption by all consumption sources on behalf of the application 208 during the interval(s) of interest.

In FIG. 2, the user device energy footprint 209 of the application 208 is provided to a carbon footprint computation engine 210 that uses renewable energy data for a geographical location of the user device 202 to convert the energy footprint 209 to a user device carbon footprint 212 representing a $CO_2$ emission equivalent of the user device energy footprint 209. The carbon footprint computation engine 210 determines a geographical location of the user device 202, such as based on an internet protocol (IP) address of the user device or based on a geographical identifier included in the device configuration data 222, and uses the geographical location to obtain (e.g., from a publicly-available data source) a value referred to herein as a "carbon multiplier" that can be multiplied by the energy footprint 209 to yield a corresponding quantity of carbon emissions in the geographical location. For example, a publicly-available lookup table can be accessed to determine that, in the United States, each mega-watt hour (MWhr) of power consumption releases, on average, 0.475 metric tons of carbon dioxide equivalent ($mtCO_2e$) into the atmosphere.

The carbon footprint computation engine 210 uses the obtained carbon multiplier to convert the user device energy footprint 209 to the user device carbon footprint 212. In an example where the user device energy footprint 209 include the information shown above with respect to the header "Example Contents of User Device Energy Footprint", the corresponding user device carbon footprint 212 includes the following information:
Carbon-Specific Energy Footprint Example
    CPU Carbon Footprint: 0.00000526171 $mtCO_2$
    GPU Carbon Footprint: 0.0000000687 $mtCO_2$
    Memory Carbon Footprint (Disk Carbon Footprint): 0.0000000351 $mtCO_2$
    Display Carbon Footprint: 0.0000021416 $mtCO_2$
    Network Carbon Footprint: 0.000000155 $mtCO_2$
    Loss Carbon Footprint: 0.000000120 $mtCO_2$
    Notably, a carbon footprint is a carbon-equivalent expression of the user device energy footprint 209 and some implementations of disclosed technology do not compute the user device carbon footprint 212. However, computing the user device carbon footprint 212 can be useful because this metric may, if presented to an end user, be more meaningful than other formats due to increased user awareness and growing user interest in carbon-specific data. In addition to being potentially of interest to an end user, carbon-specific metrics are often desired by original equipment manufacturers (OEMs) because it is common for OEMs to be subjected to vendor-imposed carbon mitigation requirements. Therefore, OEMs depend upon the computation of carbon-specific metrics (e.g., in units of mtCO2e) for their products so that they may evaluate compliance with these vendor-imposed requirements. Although software product suppliers are not typically subjected to carbon-specific mitigation standards, the computation of the above-described user device carbon footprint 212 for the application 208 facilitates a collection of previously-unavailable statistics (described below with respect to predefined populations 230 of devices) that allows software product vendors to determine the carbon impact of their respective software products.

In some implementations, the population-based energy savings discovery engine 206 does not include the carbon footprint computation engine 210. In the remaining description of FIG. 3, the term "Energy Footprint" is used to refer to either the user device energy footprint 209 or the user device carbon footprint 212, so as to generally describe a process of generating recommendations for implementations that do and do not include the carbon footprint computation engine 210. Notably, implementations including the carbon footprint computation engine 210 utilize the user device carbon footprint 212 to compute population-based statistics and as a basis for generating recommendations while implementations that do not include the carbon footprint computation engine 210 utilize the user device energy footprint 209 in the same or similar way.

Per the above-described operations, the population-based energy savings discovery engine 206 determines the Energy Footprint of the application 208. Energy footprints of identical or substantially similar format are likewise determined for the application 208 with respect to a plurality of other user devices and the collective energy footprints are aggregated and averaged (or otherwise normalized) across predefined populations 230 of user devices, with each different one of the predefined populations 230 consisting of user devices sharing a specific device configuration that is in some respect different from the device configuration(s) represented by the other populations defined for the application 208.

During an initial configuration of the population-based energy savings discovery engine 206, a system administrator identifies different classes of device configurations (e.g., Class 1, Class 2, Class 3) that contribute to the Energy Footprint of the application 208 and also defines different device configurations that correspond to each of the identified classes. In the example shown, three classes of device configurations—Class 1, Class 2, and Class 3—have been identified as contributors to the Energy Footprint of the application 208 on various user devices. Each of the different classes is further defined to include at least two distinct device populations corresponding to different device configurations of the class.

In the example shown, Class 1 pertains to operating system configurations and includes two device populations, Population 1 and Population 2. Here, Population 1 includes devices executing a first version of an operating system (OS version X) while Population 2 includes devices executing a second version of the operating system (e.g., OS version Y). Class 2 pertains to configurations of the application 208 (App A) and includes two device populations, Population 3 and Population 4. Population 3 includes devices executing a first version ("version X") of the application 208 (e.g., "version X") while Population 4 includes devices executing a second version ("version Y") of the application 208. Class 3 pertains to configurations of a particular driver installed on the operating system and includes respective Populations 5 and 6, which each include devices executing different respective versions of a GPU driver.

In one implementation, different classes of device populations are defined by the system administrator based on the administrator's familiarity with functionality of the application 208 and with the configuration(s) that represent the most likely significant contributors to the energy footprint of the application 208. For example, the system administrator may define Class 3 (e.g., GPU drivers) based on the knowledge that the application 208 is a particularly graphics-intensive and the presumption that graphics rendering is an area where meaningful energy savings might be identified by examining energy consumption differences associated with different GPU drivers. Likewise, if the application 208 is a video streaming application that transmits large quantities of data, the administrator might reasonably anticipate that different network configurations (e.g., Wi-Fi, Ethernet, satellite) have the potential to significantly impact the resulting the energy footprint and define a class to "study" populations of devices with these different network configurations in a manner consistent with the classes shown in the illustrated example.

In another implementation, the population-based energy savings discovery engine 206 computes various statistics to identify and self-define or recommend classes of device populations that represent device configurations with the potential to provide energy savings. For example, the population-based energy saving discovery engine 206 parses the device configuration data 222 to identify different candidate device configurations and then computes a Z-score for populations of devices that share each of the candidate device configuration. For instance, the two-population Z-score test is a well-known statistical test that can be used to determine whether a first group of devices sharing a particular configuration and a second group of devices not sharing the particular configuration differ by statistical significance with respect to a corresponding likelihood of observing an energy footprint for an application that is reduced as compared to some benchmark degree of energy consumption. In one implementation, the population-based energy savings discovery engine 206 computes Z-scores for different device configurations and, based on these scores, recommends (e.g., to an administrator) or self-defines the classes of device configurations and the device populations 230 corresponding to such classes.

In various implementations, other classes of device configurations are defined in addition to or in lieu of the classes shown in FIG. 2. In one implementation, a class is defined to include populations that execute different supporting applications. If, for example, the application 208 is a web-based application, the class may include different device population that execute the application 208 in different respective web browsers. In another implementation, one or more classes are defined to include device populations configured with different media playback components—e.g., different decoders or operating system media features. In another implementation, a class is defined to include device populations having different power mode configurations (e.g., whether the device is plugged in (on AC power) or not or in a battery saver mode or not), as this difference is known to lead to different energy savings for different applications.

In yet another implementation, still other classes are defined to include populations pertaining to other types of device modes of operation and/or user activities pertaining to those modes of use. Device modes of operation may include various modes or settings of the user device (e.g., sleep mode settings, display settings) or modes or settings of accessory devices that cause the user compute device to consume power. If, for example, a user compute device is coupled to an external monitor operating in a high-definition resolution (HDR) mode while viewing content that is for- matting for standard definition resolution (SDR) viewing, the operating system of the user device may be expending energy attempting to scale up the SDR Resolution to match HDR resolution, leading to higher CPU energy consumption. To determine energy savings associated with SDR v. HDR use modes of the external monitor, a first population at of user devices is defined to include SDR content viewers on external monitors operating in HDR mode whereas a second population of user devices is defined to include SDR content viewers on external monitors operating in SDR mode.

In still another implementation, a class is defined to include populations classifying the "type" of machines running the application 208 as being either virtual machines (VMs) or not VMs.

Those of skill in the art can readably appreciate that there exist various other potential classes of device configurations not described above that likewise have the potential to impact with the energy footprint for the application 208 and that therefore may be used to define the predefined populations 230 of devices for other applications of interest and/or other implementations of the system 200.

Although the three classes illustrated in FIG. 2 are shown to each include two device populations, a class may, in an actual implementation, include three or more populations. For example, Class 1 (operating system configurations) may additionally include populations corresponding to three or more versions of the same operating system and/or different versions of multiple different operating systems.

Following determination of the Energy Footprint for the application 208 on the user device 202, the Energy Footprint is provided to a relevant population identifier 214 along with the device configuration data 222 for the user device 202. The relevant population identifier 214 identifies, based on the device configuration data 222 for the user device 202, a select subset of the predefined populations 230 of devices that the user device 202 belongs to (e.g., populations characterized by device configurations shared by the user device 202).

In the example shown, the relevant population identifier 214 determines, from the device configuration data 222, that the user device 202 is executing an operating system version common to all devices in Population 1. Additionally, the relevant population identifier 214 determines that the user device 202 is executing a version of the application 208 that is common to all devices in Population 3 and is also using a GPU driver that is installed on all devices in Population 5. Based on this, the relevant population identifier 214 adds the user device 202 to lists of devices (not shown) associated with Population 1, Population 3, and Population 5.

For each different one of the predefined populations 230, a population-based energy footprint computation engine 244 determines, for each of the predefined populations 230, a per-device energy footprint for the application 208 (e.g., per-device energy footprints 232, 234, 236, 238, 240, and 242).

In one implementation, the per-device energy footprint for each population represents an average of energy footprint observed with respect to all devices included in the population. For example, population-based energy footprint computation engine 244 maintains a cumulative carbon footprint (e.g., in mtCO₂e) for each of the predefined populations 230 that represents a total (summed) carbon impact of the application 208 that is attributable to instances of the application 208 executing on all devices within the population. For each of the predefined populations 230 of devices, the cumulative carbon footprint is translated to a per-device carbon footprint for the population by dividing the population's cumulative carbon footprint by the number of devices in the population.

In some implementations where the Energy Footprint itemizes energy consumption by different hardware components (as in the above examples), a per-device energy footprint for a given population is computed based on a select subset of the itemized quantities of energy consumption determined to be relevant to the device configuration shared by the population. For example, the per-device energy footprint for populations within a class entitled "different GPU configurations" may be determined based on a GPU-specific portion of the computed energy footprints (e.g., based on the "GPU Carbon Footprint" item within the "Carbon-Specific Energy Footprint Example" provided above) and not based on other portions of the computed energy footprints. While not required for implementation, computing the per-device energy footprint for each population based on portion(s) of the Energy Footprint determined to have a specific/strong linkage to the population's characteristic device configuration may help to eliminate statistical noise within the population-based footprints that stemming from device-to-device configuration differences within the devices of one of the predefined populations 230.

In other implementations, the per-device energy footprint for a given class of populations quantifies the energy consumption of all or substantially all hardware components contributing the energy footprint of the application 208 without regard to linkages between those energy-consumption sources (hardware components) and the specific device configurations associated with the class.

With reference back to the present example: after the relevant population identifier 214 identifies a subset of the predefined populations 230 that the user device 202 is included in (e.g., Population 1, 3, and 5), the population-based energy savings discovery engine 206 updates the per-device energy footprint stored with respect to each population in the subset. For example, a device counter stored with respect to Population 1 is updated to increase the number of devices N in the population by one (to N+1), a new cumulative energy footprint is computed for Population 1 based on the Energy Footprint reported by each of the N+1 devices, and the new cumulative energy footprint is then divided by N+1 to update the per-device energy footprint for the entire population. This is repeated for each population in the subset of populations that user device 202 belongs to.

Following the above updates to the per-device energy footprints for select populations that the user device 202 belongs to, an energy savings computation and recommendation engine 216 evaluates potential energy savings with respect to a subset of the predefined populations 230 that the user device does not belong to (referred to herein as "Candidate Populations"). In the present example, the Candidate Populations include Populations 2, 4, and 6, because these populations are characterized by device configurations not shared by the user device 202.

In one implementation, this is achieved by computing an energy savings metric which is, for example, a difference between the Energy Footprint for the user device 202 and the per-device energy footprint of each of the Candidate Populations. Notably, a device configuration corresponding to a Candidate Population characterized by a per-device carbon footprint smaller than the Energy Footprint of the user device 202 represents an "energy savings configuration" for the user device 202—e.g., a configuration that, if implemented on the user device 202, provides a reduction in the Energy Footprint for the application 208.

In response to identifying at least one energy savings configuration among the Candidate Populations, the energy savings computation and recommendation engine 216 generates a reconfiguration recommendation 246. In an implementation where a single energy savings configuration is identified for a select population among the Candidate Populations, the reconfiguration recommendation 246 recommends that the user alter a configuration of the user device 202 to match the device configuration shared by the devices in the select population characterized by the energy savings configuration. Below is an example of and Energy Footprint for the user device 202 and an example Per-Device Energy Footprint for a Candidate Population (e.g., Population 6) that presents a potential energy savings with respect to items shown in bold text:

User Device Energy Footprint for Application A

CPU Carbon Footprint: 0.00000526171 mtCO2

GPU Carbon Footprint: 0.0000000687 mtCO2

Memory Carbon Footprint (Disk Carbon Footprint): 0.0000000351 mtCO2

Display Carbon Footprint: 0.0000021416 mtCO2

Network Carbon Footprint: 0.000000155 mtCO2

Loss Carbon Footprint: 0.000000120 mtCO2

Per Device Energy Footprint for Application A within Population 6

CPU Carbon Footprint: 0.00000513112 mtCO2

GPU Carbon Footprint: 0.0000000077 mtCO2

Memory Carbon Footprint: 0.0000000121 mtCO2

Display Carbon Footprint: 0.0000021416 mtCO2

Network Carbon Footprint: 0.000000155 mtCO2

Loss Carbon Footprint: 0.000000120 mtCO2

Given the example energy footprints above, the energy savings computation and recommendation engine 216 determines that the device configuration shared by Population 6 presents an estimated energy savings as follows:

Estimated Energy Savings:

CPU Carbon Savings: 1.3059e-7

GPU Carbon Savings: 6.1e-8

Memory Carbon Savings: 2.3e-8

Net Carbon Savings: 1.31e-7

Based on this, the energy savings computation and recommendation engine 216 generates a reconfiguration recommendation (e.g., 246) that says "Reduce the Carbon Footprint of App A by Upgrading to GPU driver version Y." This recommendation is transmitted to the user device 202 and presented on a display of the user device 202. In some implementations, the reconfiguration recommendation 246 specifically identifies the quantity of energy savings that can be realized by implementing the recommended configuration change.

In an implementation where multiple energy savings configurations are identified among the Candidate Populations, the reconfiguration recommendation 246 may generate multiple reconfiguration recommendations or recommend that the user implement the configuration change associated with the largest energy savings.

Figure 3:
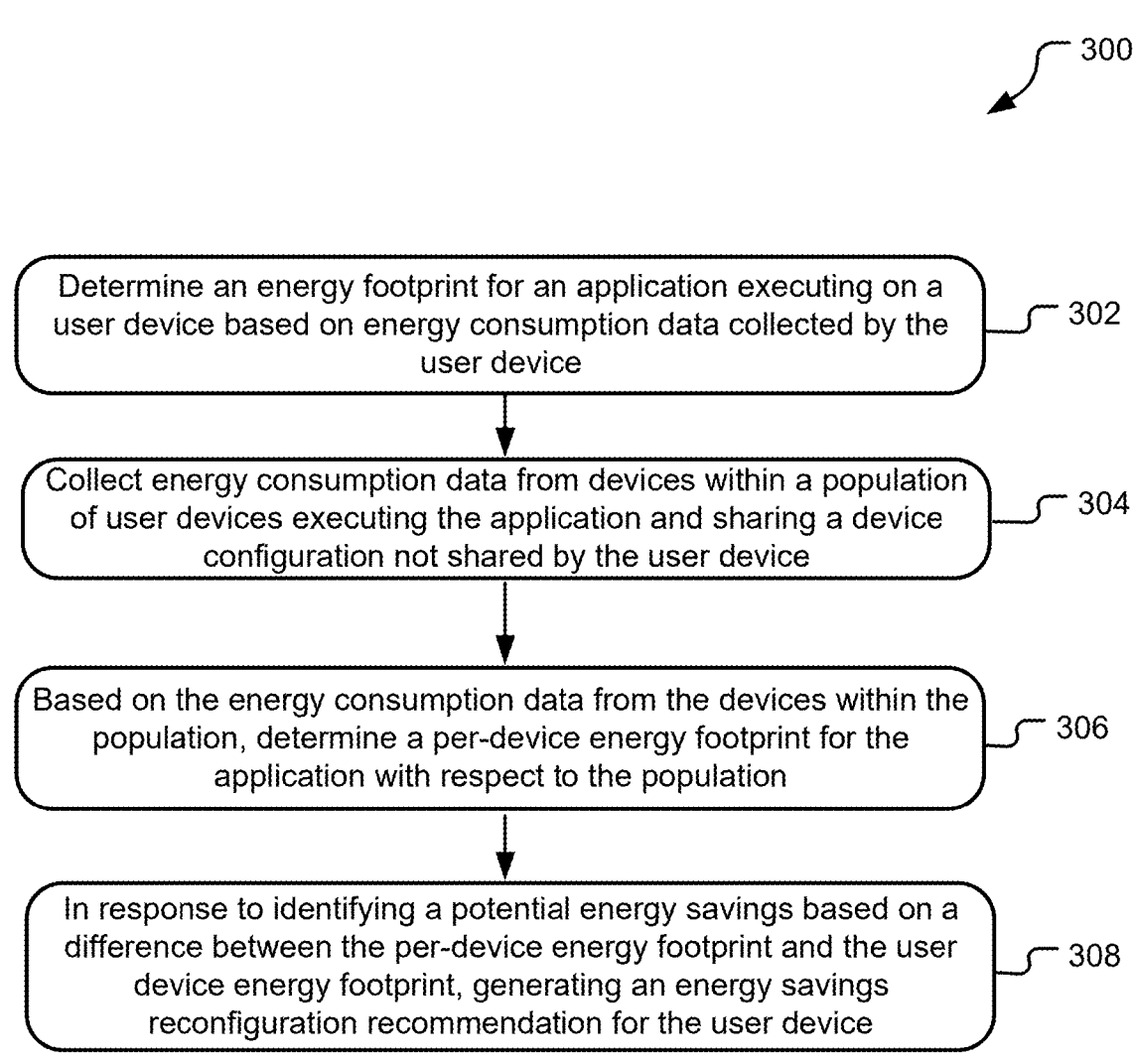
FIG. 3 illustrates example operations for obtaining population-based metrics usable to identify and recommend alternative configurations for a user device that reduce or mitigate the energy footprint of a particular application executing on the user device.

FIG. 3 illustrates example operations 300 for obtaining population-based metrics usable to identify and recommend alternative configurations for a user device that reduce or mitigate the energy footprint of a particular application executing on the user device. A determining operation 302 determines an energy footprint for an application executing on a user device based on energy consumption metrics collected by the user device. In one implementation, a cloud-based service determines the energy footprint based on energy consumption data reported by the user device. In another implementation, the user device self-computes the energy footprint for the application.

A collecting operation 304 collects the energy consumption data from devices within a population of user devices executing the application. The devices in the population share a device configuration not shared by the user device.

A population-based energy footprint determination operation 306 determines a per-device energy footprint for the application, which can also be understood by those in the manufacturing industry as an "energy intensity"—a term used to refer to a measurement of energy consumption per gross domestic product (e.g., where the "product" is, in this case, an individual instance of the application). The per-device energy footprint or "energy intensity" represents energy expended due to execution of a single instance of the application but is determined with respect to the population as a whole based on the energy consumption data from the devices within the population. The per-device energy footprint for the application is, for example, determined by averaging or otherwise normalizing energy footprints determined for all devices in the population.

A recommendation generation operation 308 generates an energy savings reconfiguration recommendation for the user device in response to identifying a potential energy savings realized from a comparison of the user device energy footprint for the application and the per-device energy footprint for the application that is determined for the population as a whole. In one implementation, the energy savings reconfiguration recommendation recommends an alternative device configuration for the user device that matches the device configuration shared by user devices within the population.

In some implementations, the per-device energy footprint for the application is determined for each population of multiple predefined populations associated with defined classes of configurations. In these implementations, the operations 300 further provide for identifying candidate populations characterized by device configurations not shared by the user device and computing an energy savings metric with respect to some or all of the candidate populations. A select population associated with the energy savings metric representing a largest energy savings is then selected from the candidate populations and the energy savings reconfiguration recommendation recommends that the user device alter a configuration to match a device configuration shared by the devices in the select population.

Implementations of the disclosed technology utilize the energy savings reconfiguration recommendation in different ways. In some implementations, the energy savings reconfiguration recommendation is transmitted to the user device and presented on a display, which gives the user the option to self-configure the user device in accord with the recommendation. In other implementations, the energy savings reconfiguration recommendation is transmitted to the user device and the user device automatically reconfigures the user device in accord with the recommendation. This may be the case when, for example, the user device is configured to automatically install updates and/or software products determined to reduce energy consumption of the user devices.

In still other implementations, the energy savings reconfiguration recommendation is provided to a creator or vendor of the application or of other software product(s) referenced by the recommendation, such as to allow the creator or vendor to assess the root cause of the energy savings to inform the development of future software product(s). If, for example, the creator of an application is made aware that the newest release of the application significantly increases the application's energy footprint, the creator may the conduct investigative analytics to better understand causes for the increased energy consumption and, if feasible, release a patch or update that deploys logic to mitigate this increase.

Figure 4:
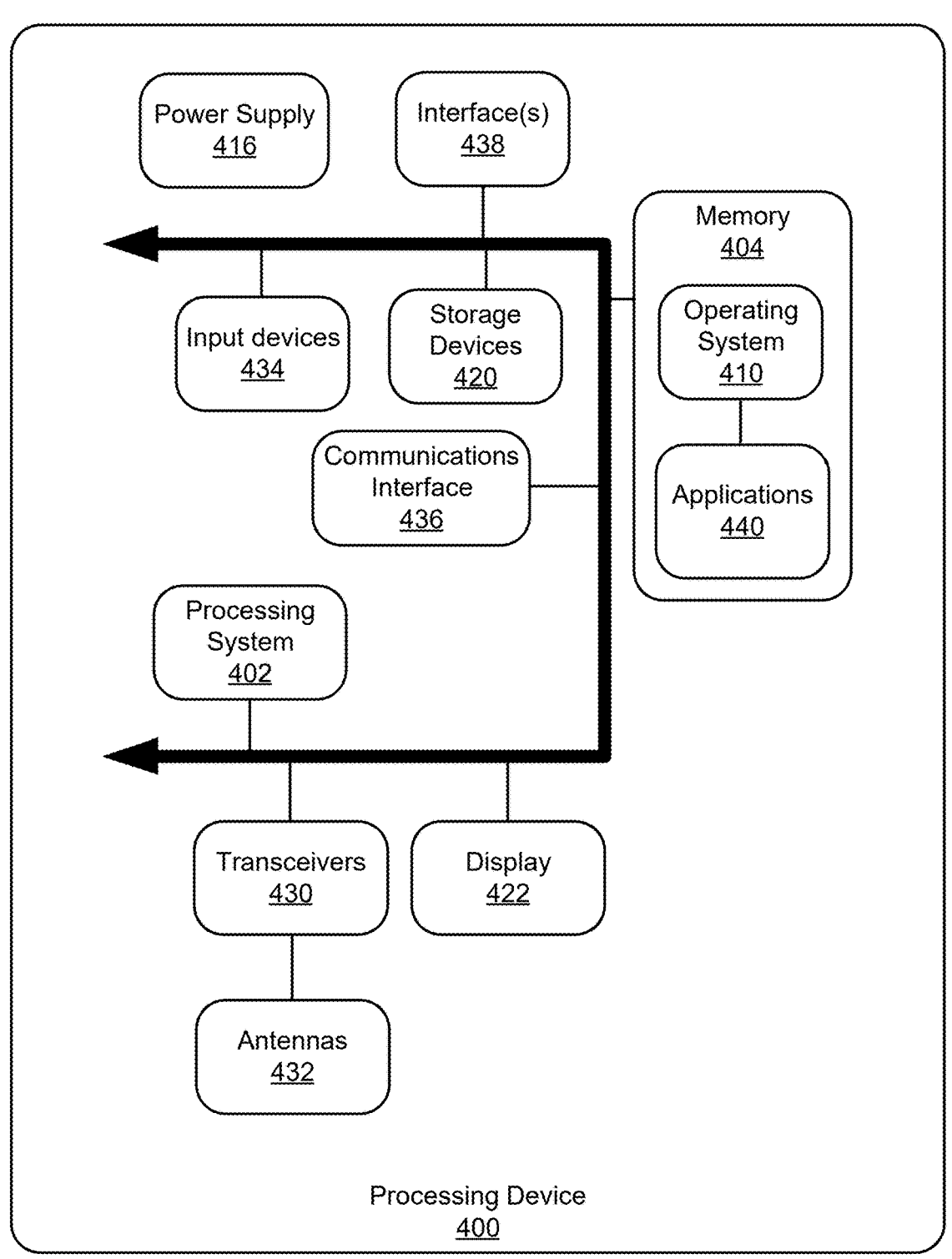
FIG. 4 illustrates an example schematic of a processing device suitable for implementing aspects of the disclosed technology.

FIG. 4 illustrates an example schematic of a processing device 400 suitable for implementing aspects of the disclosed technology. The processing device 400 includes a processing system 402, memory 404, a display 422, and other interfaces 438 (e.g., buttons). The processor system 402 may each include one or more computer processing units (CPUs), graphics processing units (GPUs), etc.

The memory 404 generally includes both volatile memory (e.g., random access memory (RAM)) and non-volatile memory (e.g., flash memory). An operating system 410, such as the Microsoft Windows® operating system, the Microsoft Windows® Phone operating system or a specific operating system designed for a gaming device, may reside in the memory 404 and be executed by the processing system 402, although it should be understood that other operating systems may be employed.

One or more applications 440 (e.g., an application for collecting energy consumption data or a population-based energy savings discovery engine 206) are loaded in the memory 404 and executed on the operating system 410 by the processing system 402. In some implementations, aspects of the population-based energy savings discovery engine 206 are loaded into memory of different processing devices connected across a network. The applications 440 may receive inputs from one another as well as from various input local devices 434 such as a microphone, input accessory (e.g., keypad, mouse, stylus, touchpad, gamepad, racing wheel, joystick), or a camera.

Additionally, the applications 440 may receive input from one or more remote devices, such as remotely-located servers or smart devices, by communicating with such devices over a wired or wireless network using more communication transceivers 430 and an antenna 432 to provide network connectivity (e.g., a mobile phone network, Wi-Fi®, Bluetooth®). The processing device 400 may also include one or more storage devices 420 (e.g., non-volatile storage). Other configurations may also be employed. In one implementation, population-based energy savings discovery engine 206 of FIG. 2 is an application executing on the processing device 400 or as a distributed application with different components executing on many different devices.

The processing device 400 further includes a power supply 416, which is powered by one or more batteries or other power sources and which provides power to other components of the processing device 400. The power supply 416 may also be connected to an external power source (not shown) that overrides or recharges the built-in batteries or other power sources.

The processing device 400 may include a variety of tangible computer-readable storage media and intangible computer-readable communication signals. Tangible computer-readable storage can be embodied by any available media that can be accessed by the processing device 400 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes RAM, read-only memory (ROM), electrically erasable programmable read-only memory (EEPROM), flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, radio frequency (RF), infrared and other wireless media.

In some aspects, the techniques described herein relate to a processor-implemented method including: determining a user device energy footprint for an application executing on a user device based on energy consumption data collected by the user device; collecting the energy consumption data from devices within a population of user devices executing the application, the population of user devices being characterized by a device configuration not shared by the user device; based on the energy consumption data from the devices within the population, determining a per-device energy footprint for the application with respect to the population; in response to identifying a potential energy savings based on a comparison between the per-device energy footprint within the population and the user device energy footprint, generating an energy savings reconfiguration recommendation that recommends an alternative device configuration for the user device that matches the device configuration shared by user devices within the population; and transmitting the energy savings reconfiguration recommendation to the user device.

In some aspects, the techniques described herein relate to a processor-implemented method, further including: collecting energy consumption metrics pertaining to the user device energy footprint of the application with respect to devices of multiple different populations, each population of the multiple different populations being characterized by a device configuration shared by devices within the population.

In some aspects, the techniques described herein relate to a processor-implemented method, wherein at least two populations of the multiple different populations are characterized by different versions of a particular software component or different device modes of operation.

In some aspects, the techniques described herein relate to a processor-implemented method, determining the per-device energy footprint for the application for each population of the multiple different populations of user devices; determining an energy savings metric with respect to select populations of the multiple different populations characterized by device configurations not shared by the user device, the energy savings metric being based on a difference between the user device energy footprint and the per-device energy footprint; and selecting the population from the multiple different populations, the population being characterized by the energy savings metric representing a largest energy savings.

In some aspects, the techniques described herein relate to a processor-implemented method, further including: determining energy consumption metrics from the user device pertaining to the user device energy footprint of the application; and determining the energy consumption metrics from the population of user devices executing the application, wherein the energy consumption metrics specifies at least one of: energy consumed by a central processing unit (CPU) or a graphics processing unit (GPU) during execution of the application; energy consumed by display electronics to display graphics generated of the application; energy consumed by networking components to receive and send data of the application; or energy consumed to store data of the application.

In some aspects, the techniques described herein relate to a processor-implemented method, wherein the user device energy footprint is a user device carbon footprint and the per-device energy footprint is a per-device carbon footprint.

In some aspects, the techniques described herein relate to a processor-implemented method, wherein the device configuration shared by the population of user devices defines at least one of: one or more other applications co-executed with the application; a version of the application; a version of an operating system; or a user-configurable device mode of operation.

In some aspects, the techniques described herein relate to a processor-implemented method, wherein the energy savings reconfiguration recommendation includes at least one of: a recommendation to install an alternate version of the application or an alternate operating system on the user device; a recommendation to change an operation mode of the user device or of a device accessory while executing the application; or a recommendation to install a different component driver on the user device.

In some aspects, the techniques described herein relate to a system including: a population-based energy savings discovery engine stored in memory that: determines a user device energy footprint for an application executing on a user device; determines a per-device energy footprint for the application with respect to multiple defined populations of user devices executing the application, each population being characterized by a different device configuration shared by user devices within the population; generates an energy savings reconfiguration recommendation that recommends an alternative device configuration for the user device in response to identifying a potential energy savings based on a difference between the per-device energy footprint for a select population of the multiple defined population and the user device energy footprint; and transmits the energy savings reconfiguration recommendation to the user device, the user device being configured to present the energy savings reconfiguration recommendation on a display.

In some aspects, the techniques described herein relate to a system, wherein the alternative device configuration matches a device configuration shared by user devices within the select population.

In some aspects, the techniques described herein relate to a system, wherein at least two populations of the multiple defined populations are characterized by different versions of a particular software component or different device modes of operation.

In some aspects, the techniques described herein relate to a system, wherein the population-based energy savings discovery engine: computes an energy savings metric with respect to candidate populations of the multiple defined populations characterized by device configurations not shared by the user device, the energy savings metric being based on a difference between the user device energy footprint and the per-device energy footprint for each of the candidate populations; and identifying a select population of the candidate populations characterized by a largest value of the energy savings metric, wherein energy savings reconfiguration recommendation recommends a device configuration shared by devices in the select population.

In some aspects, the techniques described herein relate to a system, wherein the population-based energy savings discovery engine: determines energy consumption metrics from the user device pertaining to the user device energy footprint of the application; determines the energy consumption metrics for each device in the multiple defined populations of user devices executing the application, wherein the energy consumption metrics specifies at least one of: energy consumed by a central processing unit (CPU) or a graphics processing unit (GPU) during execution of the application; energy consumed by display electronics to display graphics generated of the application; energy consumed by networking components to receive and send data of the application; or energy consumed to store data of the application.

In some aspects, the techniques described herein relate to a system, wherein the user device energy footprint is a user device carbon footprint and the per-device energy footprint is a per-device carbon footprint.

In some aspects, the techniques described herein relate to a system, wherein one of the multiple defined populations is characterized by a device configuration that specifies: one or more other applications co-executed with the application; a version of the application; a version of an operating system; or a user-configurable device mode of operation.

In some aspects, the techniques described herein relate to a system, wherein the energy savings reconfiguration recommendation includes at least one of: a recommendation to install an alternate version of the application or an alternate operating system on the user device; a recommendation to change an operational mode of the user device or of a device accessory while executing the application; or a recommendation to install a different component driver on the user device.

In some aspects, the techniques described herein relate to a tangible computer-readable storage media encoding instructions for executing a computer process, the computer process including: determining a user device energy footprint for an application executing on a user device; determining a per-device energy footprint for the application with respect to multiple defined populations of user devices executing the application, each population being characterized by a different device configuration shared by user devices within the population; and in response to identifying a potential energy savings based on a difference between the per-device energy footprint for a select population of the multiple defined populations and the user device energy footprint, generating an energy savings reconfiguration recommendation that recommends an alternative device configuration for the user device and that is based on a device configuration shared by devices in the select population.

In some aspects, the techniques described herein relate to a tangible computer-readable storage media, wherein at least two populations of the multiple defined populations are characterized device configurations that respectively include different versions of a particular software component or different device modes of operation.

In some aspects, the techniques described herein relate to a tangible computer-readable storage media, wherein the computer process further includes: identifying candidate populations from the multiple defined populations; the candidate populations each being characterized by a device configuration that is not shared by the user device; computing an energy savings metric with respect to each of the candidate populations, the energy savings metric being based on a difference between the user device energy footprint and the per-device energy footprint of a select candidate population; and identifying a select population of the candidate populations for which the energy savings metric represents a greatest energy savings, wherein the energy savings reconfiguration recommendation recommends a device configuration shared by devices in the select population.

In some aspects, the techniques described herein relate to a tangible computer-readable storage media, wherein the select population is characterized by device configuration specifying a particular version of a software component and the energy savings reconfiguration recommendation recommends installation of the particular version of the software component. The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A processor-implemented method comprising:
    determining a user device energy footprint for an application executing on a user device based on energy consumption data collected by the user device;
    collecting the energy consumption data from devices within a population of user devices executing the application, the population of user devices being characterized by a common device configuration that includes a commonly-executed software component or common operational mode that is not shared by the user device;
    based on the energy consumption data from the devices within the population, determining a per-device energy footprint for the application with respect to the population;

identifying a potential energy savings attributable to commonly-executed software component or common operational mode by comparing the user device energy footprint for the application to the per-device energy footprint for the application that is determined for the population;
    in response to identifying the potential energy savings, generating an energy savings reconfiguration recommendation that recommends an alternative device configuration for the user device that matches the common device configuration shared by user devices within the population; and
    automatically initializing a reconfiguration of the user device by transmitting the energy savings reconfiguration recommendation to the user device, the user device being configured to respond to the energy savings reconfiguration recommendation by automatically installing the commonly-executed software component or altering an operational mode of the user device to match the common operational mode and thereby reduce the user device energy footprint for the application.

2. The processor-implemented method of claim 1, further comprising:
    collecting energy consumption metrics pertaining to the user device energy footprint of the application with respect to devices of multiple different populations, each population of the multiple different populations being characterized by a device configuration shared by devices within the population.

3. The processor-implemented method of claim 2, wherein at least two populations of the multiple different populations are characterized by different versions of a particular software component or different device modes of operation.

4. The processor-implemented method of claim 2,
    determining the per-device energy footprint for the application for each population of the multiple different populations of user devices;
    determining an energy savings metric with respect to select populations of the multiple different populations characterized by device configurations not shared by the user device, the energy savings metric being based on a difference between the user device energy footprint and the per-device energy footprint; and
    selecting the population from the multiple different populations, the population being characterized by the energy savings metric representing a largest energy savings.

5. The processor-implemented method of claim 1, further comprising:
    determining energy consumption metrics from the user device pertaining to the user device energy footprint of the application; and
    determining the energy consumption metrics from the population of user devices executing the application, wherein the energy consumption metrics specifies at least one of:
    energy consumed by a central processing unit (CPU) or a graphics processing unit (GPU) during execution of the application;
    energy consumed by display electronics to display graphics generated of the application;
    energy consumed by networking components to receive and send data of the application; or
    energy consumed to store data of the application.

6. The processor-implemented method of claim 1, wherein the user device energy footprint is a user device carbon footprint and the per-device energy footprint is a per-device carbon footprint.

7. The processor-implemented method of claim 1, wherein the common device configuration shared by the population of user devices defines at least one of:

one or more other applications co-executed with the application;

a version of the application;

a version of an operating system; or a user-configurable device mode of operation.

8. The processor-implemented method of claim 1, wherein the energy savings reconfiguration recommendation includes at least one of:

a recommendation to install an alternate version of the application or an alternate operating system on the user device;

a recommendation to change an operation mode of the user device or of a device accessory while executing the application; or a recommendation to install a different component driver on the user device.

9. A system comprising:

a population-based energy savings discovery engine stored in memory that:

determines a user device energy footprint for an application executing on a user device;

determines a per-device energy footprint for the application with respect to multiple defined populations of user devices executing the application, each population being characterized by a different device configuration shared by user devices within the population, wherein the different device configuration of each of the multiple defined populations includes a commonly-executed software component or common operational mode;

identifies a potential energy savings attributable to the commonly-executed software component or the common operational mode by comparing the user device energy footprint for the application to the per-device energy footprint for the application determined with respect to a select population of the multiple defined populations;

in response to identifying the potential energy savings, generates an energy savings reconfiguration recommendation that recommends an alternative device configuration for the user device that matches the different device configuration shared by devices in the select population; and automatically initializes a reconfiguration of the user device by transmitting the energy savings reconfiguration recommendation to the user device, the user device being configured to respond to the energy savings reconfiguration recommendation by automatically installing the commonly-executed software component or altering an operational mode of the user device to match the common operational mode and thereby reduce the user device energy footprint for the application executing on the user device.

10. The system of claim 9, wherein the alternative device configuration matches a device configuration shared by user devices within the select population.

11. The system of claim 9, wherein at least two populations of the multiple defined populations are characterized by different versions of a particular software component or different device modes of operation.

12. The system of claim 9, wherein the population-based energy savings discovery engine:

computes an energy savings metric with respect to candidate populations of the multiple defined populations characterized by device configurations not shared by the user device, the energy savings metric being based on a difference between the user device energy footprint and the per-device energy footprint for each of the candidate populations; and identifying a select population of the candidate populations characterized by a largest value of the energy savings metric, wherein energy savings reconfiguration recommendation recommends a device configuration shared by devices in the select population.

13. The system of claim 9, wherein the population-based energy savings discovery engine:

determines energy consumption metrics from the user device pertaining to the user device energy footprint of the application;

determines the energy consumption metrics for each device in the multiple defined populations of user devices executing the application, wherein the energy consumption metrics specifies at least one of:

energy consumed by a central processing unit (CPU) or a graphics processing unit (GPU) during execution of the application;

energy consumed by display electronics to display graphics generated of the application;

energy consumed by networking components to receive and send data of the application; or energy consumed to store data of the application.

14. The system of claim 9, wherein the user device energy footprint is a user device carbon footprint and the per-device energy footprint is a per-device carbon footprint.

15. The system of claim 9, wherein one of the multiple defined populations is characterized by a device configuration that specifies:

one or more other applications co-executed with the application;

a version of the application;

a version of an operating system; or a user-configurable device mode of operation.

16. The system of claim 9, wherein the energy savings reconfiguration recommendation includes at least one of:

a recommendation to install an alternate version of the application or an alternate operating system on the user device;

a recommendation to change an operational mode of the user device or of a device accessory while executing the application; or a recommendation to install a different component driver on the user device.

17. A tangible computer-readable storage media encoding instructions for executing a computer process, the computer process comprising:

determining a user device energy footprint for an application executing on a user device;

determining a per-device energy footprint for the application with respect to multiple defined populations of user devices executing the application, each population being characterized by a different device configuration shared by user devices within the population, wherein the different device configuration of each of the multiple defined populations includes a commonly-executed software component or common operational mode;

identifying a potential energy savings attributable to the commonly-executed software component or the common operational mode by comparing the user device energy footprint for the application to the per-device energy footprint for the application that is determined for a select population of the multiple defined populations; and in response to identifying the potential energy savings, generating an energy savings reconfiguration recommendation that recommends an alternative device configuration for the user device that matches the different device configuration shared by devices in the select population;

automatically initializing a reconfiguration of the user device by transmitting the energy savings reconfiguration recommendation to the user device, the user device being configured to reduce the user device energy footprint for the application by automatically installing the commonly-executed software component or reconfiguring the user device in the common operational mode in response to receipt of the energy savings reconfiguration recommendation.

18. The tangible computer-readable storage media of claim 17, wherein at least two populations of the multiple defined populations are characterized device configurations that respectively include different versions of a particular software component or different device modes of operation.

19. The tangible computer-readable storage media of claim 17, wherein the computer process further comprises:

identifying candidate populations from the multiple defined populations; the candidate populations each being characterized by a device configuration that is not shared by the user device;

computing an energy savings metric with respect to each of the candidate populations, the energy savings metric being based on a difference between the user device energy footprint and the per-device energy footprint of a select candidate population; and identifying a select population of the candidate populations for which the energy savings metric represents a greatest energy savings, wherein the energy savings reconfiguration recommendation recommends a device configuration shared by devices in the select population.

20. The tangible computer-readable storage media of claim 19, wherein the select population is characterized by device configuration specifying a particular version of a software component, and the energy savings reconfiguration recommendation recommends installation of the particular version of the software component.

* * * * *